United States Patent [19]

Carmien

[11] Patent Number: 5,404,616
[45] Date of Patent: Apr. 11, 1995

[54] HAND TOOL WITH REMOVABLE HANDLE

[76] Inventor: Joseph A. Carmien, 525 N. Maple Dr., Beverly Hills, Calif. 90210

[21] Appl. No.: 130,110

[22] Filed: Sep. 30, 1993

[51] Int. Cl.$^6$ .......................... B25G 1/04; B25G 3/12; B25G 3/34
[52] U.S. Cl. ............................ 16/114 R; 16/DIG. 25; 81/177.2; 81/177.85; 403/361; 403/373; 30/341
[58] Field of Search ............. 16/114 R, 115, DIG. 25; 15/143.1, 144.3, 144.4, 145; 403/356, 361, 373; 81/177.2, 177.85; 30/341

[56] References Cited

U.S. PATENT DOCUMENTS

| | | | |
|---|---|---|---|
| 2,057,201 | 10/1936 | McCluskey | 30/341 |
| 2,348,903 | 5/1944 | Hart | 30/341 |
| 3,069,190 | 12/1962 | Henson | 16/114 R |
| 4,406,559 | 9/1983 | Geertsema et al. | 16/115 |
| 4,554,705 | 11/1985 | Murray | 16/DIG. 19 |
| 5,131,116 | 7/1992 | Bowdler | 16/DIG. 25 |
| 5,185,992 | 2/1993 | Garcia | 403/361 |

FOREIGN PATENT DOCUMENTS

| | | | |
|---|---|---|---|
| 1124213 | 5/1982 | Canada | 15/145 |
| 0078358 | 5/1983 | European Pat. Off. | 16/114 R |
| 1020945 | 11/1952 | France | 15/145 |
| 2139545 | 11/1984 | United Kingdom | 16/115 |

Primary Examiner—Lowell A. Larson
Assistant Examiner—Donald M. Gurley
Attorney, Agent, or Firm—Kelly, Bauersfeld & Lowry

[57] ABSTRACT

A hand tool includes at least one handle connected to a tool head in a secure and stable manner to accommodate loads incurred during normal use, wherein the handle is adapted for quick and easy removal and replacement. The tool includes a mounting tang projecting rearwardly from the tool head and having a handle adapter at a rear end thereof. The handle adapter defines a rearwardly open socket for slide-fit reception of a front end of the handle. At least one clamp is provided for securely but releasably clamping the handle front end within the adapter socket. In the preferred form, the handle is constructed from a lightweight fiber resin composite material and has an adapter cuff mounted on the front end thereof for mating slide-fit reception into the adapter socket.

27 Claims, 2 Drawing Sheets

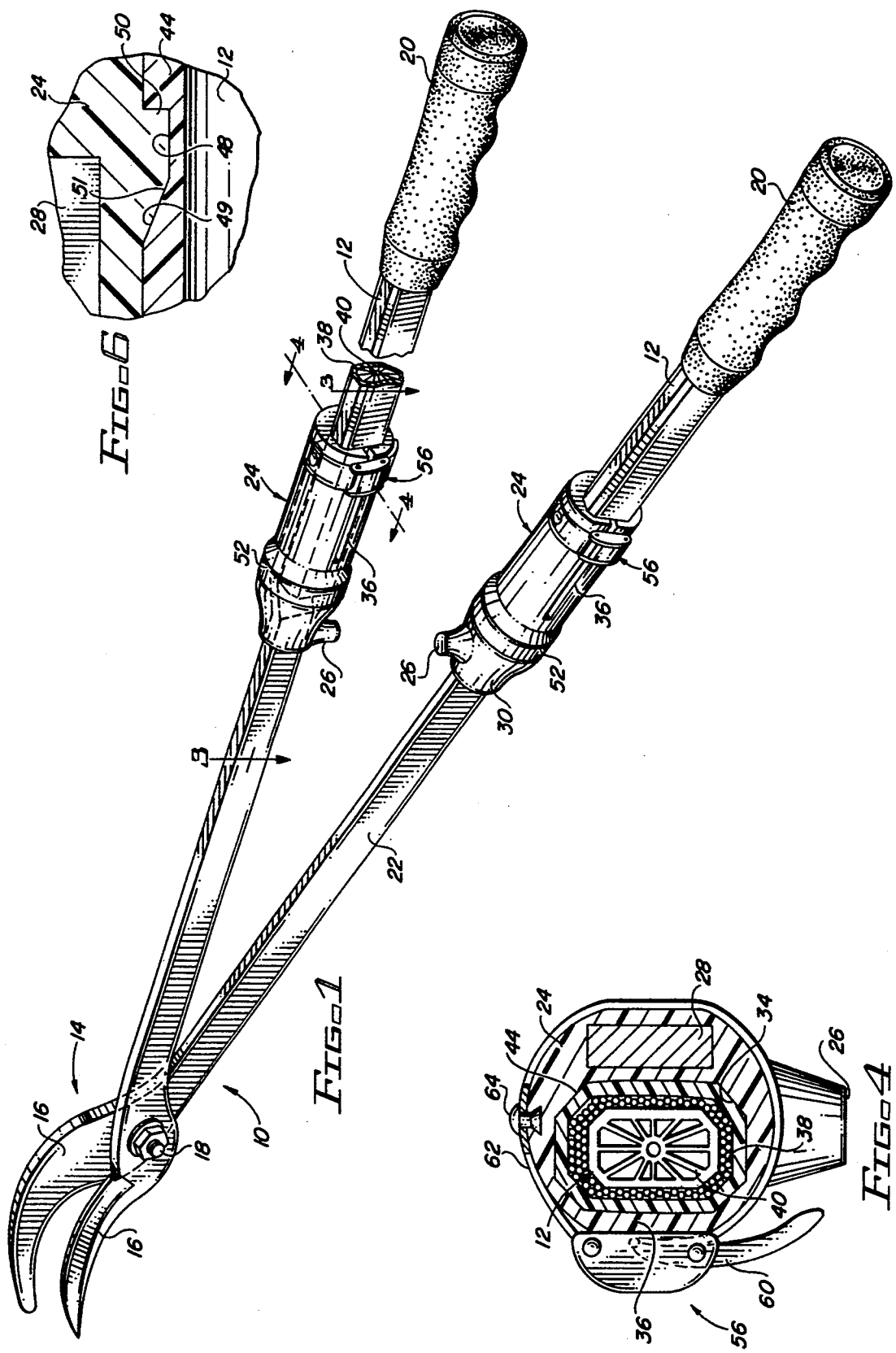

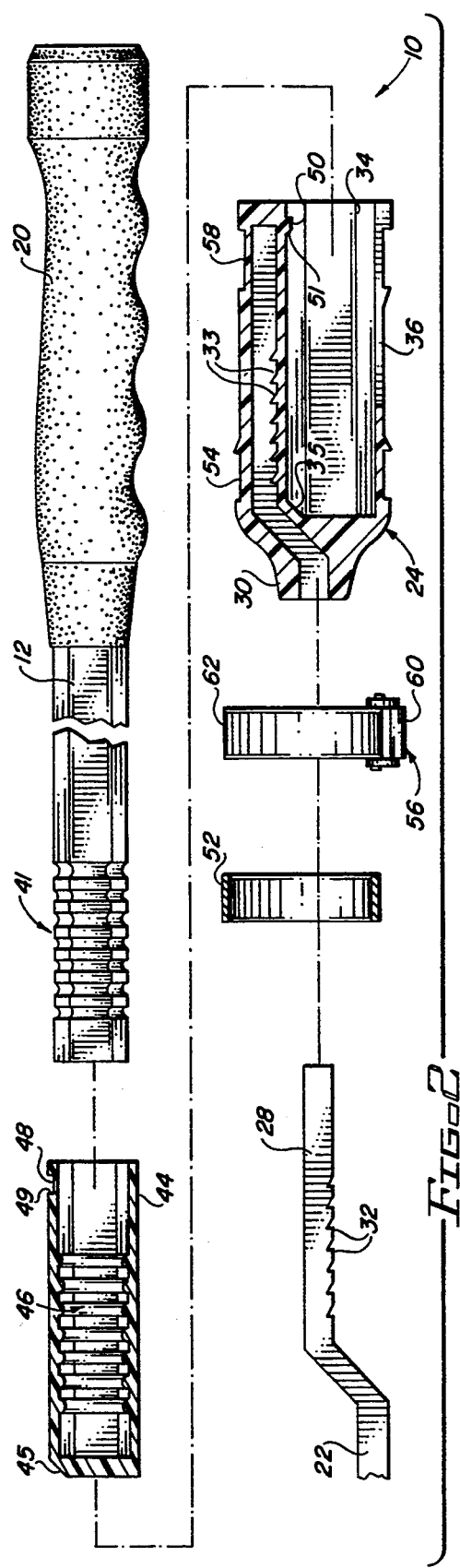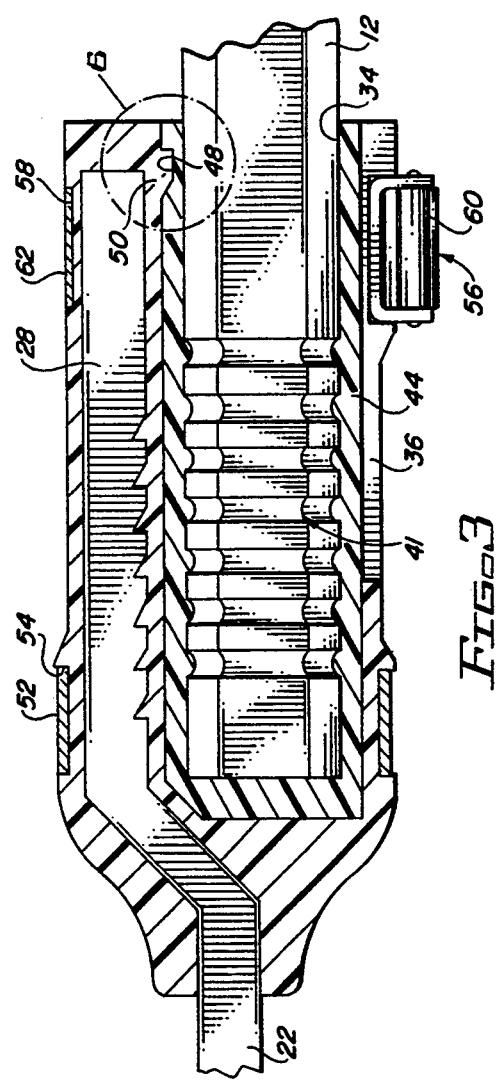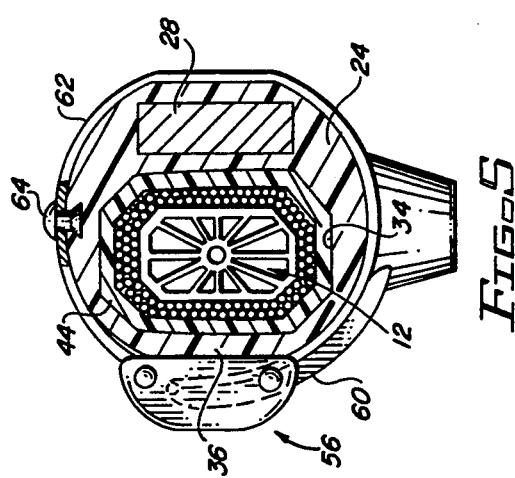

HAND TOOL WITH REMOVABLE HANDLE

BACKGROUND OF THE INVENTION

This invention relates generally to improvements in tool handles and related mounting structures and methods for connecting a tool handle to a tool head. More particularly, this invention relates to a handle mounting assembly and method for securely connecting the tool handle to the tool head in a manner permitting quick and easy handle removal and replacement.

A wide variety of hand tools are known in the art wherein a tool handle of selected length is mechanically attached to a tool head. In one typical geometry, one end of the tool handle is fitted into an eyehole or socket formed in the tool head, and mechanical locking means are provided for maintaining these components in assembled relation. In an alternative geometry, an elongated mounting tang on the tool head is press-fitted into a hole or socket formed in the end of a tool handle. In either configuration, the connection between the tool handle and the tool head is sometimes reinforced with screws, rivets, steel ferrules, and the like. In virtually all cases, the connection between the tool handle and tool head has been intended to be a permanent connection, with removal of the tool handle occurring only in the event of handle breakage or related failure of the head-handle connection.

In the past, the predominant material of choice used in tool handles has been wood. Although wooden tool handles are available in different quality grades, the useful life of wooden handles is inherently affected by various environmental factors such as weather and humidity, dry rot, termites, etc. In some hand tools such as pruning shears and the like, lightweight tubular steel handles are used in lieu of wood, wherein the hollow steel handles are typically connected in a permanent fashion to a tool head. While tubular steel handles avoid some of the disadvantages of wood, the structural integrity and strength of steel handles can be lost relatively easily in response to impact-caused dents formed in the handle structure. When that occurs, the steel handle or handles can bend or collapse relatively easily at the dent site, resulting in a need to remove and replace the damaged handle, or otherwise discard the tool.

In recent years, improved tool handles have been developed wherein a tool handle is constructed from a combination of reinforcing fibers cured within a resin composite material. These composite material handles beneficially exhibit high strength characteristics in a relatively lightweight and cost-efficient construction as described, for example, in U.S. Pat. No. 4,570,988 and copending U.S. Ser. No. 045,464, filed Apr. 8, 1993. In addition, the composite material is highly resistant to environmentally induced degradation or to impact-caused damage during tool use. Such composite material tool handles, however, still require connection means for mechanically interlocking the tool handle with the tool head.

In some hand tools, periodic removal and replacement of tool handles may be desirable for reasons other than replacement of a broken or damaged handle. For example, many hand tools such as pruning shears and hedge shears and the like include steel tool heads defining one or more sharpened cutting edges which may require periodic resharpening over the useful life of the tool. In many cases, the tool head must be returned to the manufacturer or to a professional for resharpening. In this case, it is desirable for the tool handle or handles to be removed from the tool head during resharpening, so that the tool handle or handles may be used with a second tool head, whereby work can continue without interruption.

In addition, the length of the tool handle or handles used with a particular hand tool can vary according to the task to be performed. In the example of pruning shears, relatively short handles in the range of about 12 to 18 inches are commonly used to provide adequate leverage to cut or trim small branches and the like. Larger vegetation such as tree limbs will normally require a hand tool with longer handles to provide sufficient cutting leverage. In the past, to meet these alternative requirements, multiple tools having handles of different lengths were necessary. A single tool head adapted for quick and easy connection to handles of different lengths has not been available.

The present invention provides an improved apparatus and method for connecting a tool handle to a tool head in a manner permitting quick and easy removal and replacement of the tool handle, wherein the connection is particularly adapted for use with a lightweight and high strength handle formed from fiber resin composite material.

SUMMARY OF THE INVENTION

In accordance with the invention, a hand tool includes at least one handle connected to a tool head in a secure and high strength manner which permits quick and easy removal of the handle from the tool head. The tool head includes an elongated mounting tang having a handle adapter on a rear end thereof. The handle adapter defines an open socket for securely receiving and supporting a front end of the handle. One or more releasible clamps are provided for tightly clamping and locking the front end of the handle in a securely seated position within the adapter socket.

In the preferred form, the tool handle comprises an elongated shaft constructed from a composite material including elongated fibers cured within a composite resin. The preferred tool handle shaft is defined by a composite fiber-resin jacket formed by pultrusion on a lightweight insert core, preferably with a key-locked interface between the insert core and the fiber-resin jacket as disclosed in copending U.S. Ser. No. 045,464, which is incorporated by reference herein.

The mounting tang projects rewardly from the tool head and includes a rear end defining an offset segment. The handle adapter is mounted on the offset rear end segment of the tang, preferably by injection mold formation of the handle adapter directly onto the mounting tang. The handle adapter defines the rearwardly open socket disposed generally collinearly with a primary axis of the mounting tang.

In the preferred form, an adapter cuff is mounted on the front end of the tool handle, as by injection mold formation of the cuff directly onto the handle. A portion of the handle front end includes a key-lock surface for high strength interconnection with the adapter cuff mounted thereon. The external shape of the adapter cuff is selected for substantial mating and close-fitting slide reception into the socket of the handle adapter. In this regard, the handle adapter includes a longitudinally elongated slot at one side of the socket to accommodate slight cross-sectional expansion of the socket for relatively easy slide-fit reception of the adapter cuff on the handle. An inwardly protruding tooth on the handle adapter seats within a matingly formed notch on the adapter cuff to provide an indication of proper seating of the cuff within the socket. At least one and preferably two circumferential clamps are carried about the handle adapter at longitudinally spaced positions for tightly clamping the front end of the handle within the adapter socket. The rearmost clamp and optionally both clamps are releasible to accommodate removal of the tool handle from the handle adapter in the event that handle removal is desired.

In one preferred embodiment, the invention is implemented in a multihandle tool such as pruning shears having a pair of mounting tangs connected respectively via a pair of handle adapters to a corresponding pair of tool handles having adapter cuffs mounted thereon. In this embodiment, the tool handles can be removed quickly and easily from the tool head to permit continued use of the tool handles with a second tool head when the first tool head is taken out of service, for example, for sharpening. Alternatively, the tool handles can be removed from the tool head and replaced quickly and easily by alternative tool handles of a different length chosen to suit individual task requirements.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating pruning shears equipped with removable handles in accordance with the present invention;

FIG. 2 is an enlarged and exploded plan view, shown partially in fragmented and sectional form, illustrating connection of a removable handle to a tool head in accordance with the invention;

FIG. 3 is an enlarged fragmented longitudinal sectional view taken generally on the line 3—3 of FIG. 1;

FIG. 4 is an enlarged transverse sectional view taken generally on the line 4—4 of FIG. 1;

FIG. 5 is a transverse sectional view similar to FIG. 4, and showing a releasable clamp in a closed position;

FIG. 6 is an enlarged fragmented sectional view corresponding generally with the encircled region 6 of FIG. 3.

DETAILED DESCRIPTION OF THE PREFERRED EMBODIMENT

As shown in the exemplary drawings, a hand tool referred to generally in FIG. 1 by the reference numeral 10 is equipped with one or more handles 12 used to manipulate the hand tool in the course of performing a desired task. The illustrative hand tool comprises a set of pruning shears having a tool head 14 defined by a pair of pivotally interconnected and opposed blade members 16. The two blade members 16 are connected in turn to a corresponding pair of the handles 12. In accordance with the invention, the handles 12 are adapted for quick and easy mounting onto and/or removal from the tool head 14.

The illustrative pruning shears shown in FIG. 1 represent a typical hand tool application and related working environment wherein facilitated removal and replacement of the handles 12 yields significant advantages. For example, cutting forces applied to the blade members 16 are directly proportional to the overall length between a pivot pin 18 of the tool head 14 and a pair of hand grips 20 mounted at rear ends of the two handles 12. Thus, with the present invention, relatively short handles 12 can be used with the tool head 14 in cutting applications wherein relatively small cutting forces are appropriate. Conversely, when comparatively larger cutting forces are needed, for example, in cutting or trimming branches and the like of larger cross-sectional size, the illustrative handles 12 can be removed from the tool head 14 and replaced by substitute tool handles (not shown) having a longer length sufficient to generate appropriate cutting forces. Similarly, the tool handles 12 can be removed from the tool head 14 when it is necessary to take the tool head out of service for resharpening, with the tool handles 12 being usable with an alternative tool head (not shown) during this period. Moreover, the present invention permits a broken or damaged tool handle to be replaced quickly and easily. Finally, while the invention is shown in a pruning shears embodiment, it will be understood that the invention is applicable to a wide variety of different hand tools of the type having at least one tool handle.

As shown generally in FIG. 1, the blade members 16 of the tool head 14 each include a rearwardly projecting mounting tang 22 formed typically from a tool steel in integral relation with the blade members. The mounting tangs 22 carry a pair of handle adapters 24 which are connected in turn with the pair of removable tool handles 12. The handle adapters 24 and the related connections to the tool handles 12 are in substance identical to each other, except that the handle adapters 24 shown in FIG. 1 include a facing pair of anvils 26 which engage each other when the tool handles 12 are moved to a fully closed position.

As shown best in FIG. 2 with respect to one of the handles, the mounting tang 22 extends rearwardly from the pivot pin 18 with a substantially linear configuration to a laterally offset rear end segment 28. This offset segment 28 carries the handle adapter 24. In the preferred form, the handle adapter 24 is provided as an injection molded component of relatively hard plastic, such as a glass filled nylon or the like, formed by molding directly onto the rear end segment 28 of the mounting tang 22. A front or nose end 30 of the handle adapter 24 preferably encases the bend portion of the offset segment 28, such that the handle adapter terminates a short distance in front of the offset segment 28. A longitudinal array of serrations 32 or other suitable surface discontinuities are desirably formed in the offset segment 28, resulting in mating serrations 33 on the molded adapter 24 to provide an improved key-locked connection between the tang 22 and the handle adapter 24. The handle adapter defines a rearwardly open socket 34 formed generally in a coaxial or collinear alignment with a primary longitudinal axis of the mounting tang 22.

FIG. 4 illustrates the adapter socket 34 with a noncircular and asymmetric cross sectional shape. More particularly, the cross sectional shape of the socket is defined by a polygon having a plurality of flat sides, and elongated in the direction of forces applied to the handle and tang during normal use. The cross-sectional shape of the tang 22 is similarly asymmetric, defining an elongated axis extending in parallel with the elongated axis of the socket 34. A rearwardly open side slot 36 is formed in the handle adapter 24 to extend longitudinally along the side of the socket 34 at a position opposite to the molded-in segment 28 of the tang 22.

Each handle 12 comprises a composite material structure defined by a fiber-resin jacket 38 (FIG. 4) pultruded about a lightweight insert core 40, wherein the jacket/core interface is desirably defined at least in part by a nonlinear profile geometry (not shown) to achieve a strong key-lock attachment therebetween. A front end of the handle 12 additionally includes a nonlinear profile geometry represented by a series of corrugations 41 for improved key-lock attachment with other components of the mounting assembly, as will be described in more detail. A resilient hand grip 20 is mounted as by injection molding onto a rear end of the handle 12. Tool handles of this general type, and their methods of construction, are disclosed in U.S. Pat. No. 4,570,988 and in copending U.S. Ser. No. 045,464 which are incorporated by reference herein.

In the preferred form of the invention, an adapter cuff 44 is mounted directly onto the front end of the handle 12, and has an external size and shape for mating and close-fitting slide reception into the open socket 34 of the handle adapter 24. The preferred adapter cuff 44 is formed by direct injection molding onto the front end of the handle 12, wherein the cuff 44 is formed from a suitable and relatively rigid plastic material such as a glass filled nylon or the like. The resultant cuff 44 has an inside surface defined by an array of corrugations 46 (FIG. 2) which match and thus key-lock with the corrugations 41 on the handle.

The front end of the handle 12, including the adapter cuff 44 is press-fitted into the rearwardly open socket 34 of the handle adapter 24. In this regard, as shown in FIG. 4, the cuff 44 has a noncircular cross sectional shape for mated reception into the socket 34 of similar noncircular cross-sectional shape. An angularly set nose corner 45 is provided on a leading edge of the cuff for mated engagement with a similarly shaped nose corner 35 within the socket to insure correct orientation of the cuff 44 within the socket 34. A notch 48 (FIGS. 3 and 6) formed near a rear margin of the cuff 44 has a size and shape for snap-fit reception of an inwardly protruding lock key or tooth 50 within the socket 34, thereby providing positive tactile feedback indicating proper and fully seated placement of the cuff 44 within the socket 34. The side slot 36 formed in the handle adapter 24 accommodates sufficient diametric expansion of the socket 34 to permit smooth press-fitted placement of the cuff 44 into the handle adapter.

A pair of clamp members are carried about the handle adapter 24 for securely locking the front end of the handle 12 therein. In a preferred form, a forward clamp member 52 is provided in the form of a circular clamping or hoop ring retained within a circumferential groove 54 in tightly clamped relation about the handle adapter. A rear clamp member 56 comprises a releasible clamp seated within a rear groove 58 on the handle adapter. The releasible clamp 56 has an over-center latch lever 60 which can be released to accommodate socket expansion sufficient for handle placement therein (FIG. 4). When the front end of the handle 12 is fully seated within the handle adapter, the latch lever 60 can be closed (FIG. 5) quickly and easily to cinch a band 62 on the adapter for tightly clamping the handle in place. This band 62 may be attached by a rivet 64 or the like (FIGS. 4 and 5) to the adapter. If desired, a releasible clamp member 56 may be used at both front and rear ends of the handle adapter.

If and when handle removal is necessary or desirable, the latch lever 60 can be opened to the position shown in FIG. 4. In the open position the adapter cuff 44 and handle therein can be withdrawn from the handle adapter 24. A ramped leading edge 49 on the cuff notch 48 engages a matingly ramped trailing edge 51 on the lock key 50 to accommodate slide-over movement of the cuff past the lock key 50 during handle withdrawal. A replacement handle can thereafter be installed quickly and easily, and the latch lever 60 reclosed to permit resumed tool use.

In use, the handle adapter 24 provides a high strength connection between the tool tang 22 and the handle 12. The clamps 52 and 56 effectively lock the adapter 24 on the front end of the handle 12, providing rigid fulcrum points to carry tool loads. The material of the adapter 24 as well as the material of the cuff 44 are loaded in compression, thereby effectively transferring loads to the clamps without significant risk of the tang-handle connection becoming loose.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. A hand tool, comprising:
   a tool head having a mounting tang;
   a handle adapter on said tang, said handle adapter defining a socket with an expansible cross section;
   a tool handle including an adapter cuff mounted on one end of said tool handle, said adapter cuff having a size and shape for substantially mated slide-fit reception into the socket of said handle adapter, wherein said handle adapter and said cuff cooperatively define tooth and notch means for snap-fit interengagement when said cuff is fully seated within said socket of said handle adapter; and
   clamp means carried about said handle adapter for tightly clamping said handle adapter onto said tool handle.

2. The hand tool of claim 1 wherein said tooth and notch means comprises a tooth on said handle adapter to project into said socket, and a notch formed in said cuff.

3. The hand tool of claim 1 wherein said clamp means is releasible, said tooth and notch means defining interengageable ramped surfaces to permit slide-out removal of said handle from said handle adapter.

4. The hand tool of claim 1 wherein said clamp means comprises a releasible clamp.

5. The hand tool of claim 1 wherein said clamp means comprises at least two clamps mounted on said handle adapter in longitudinally spaced relation along the length of said socket.

6. The hand tool of claim 1 wherein said handle adapter further defines a slot formed along one side of and opening into said socket, said slot extending to an open end of said socket.

7. The hand tool of claim 1 wherein said mounting tang defines a primary axis and extends from the tool head to an end segment offset from said primary axis, said handle adapter being mounted on said end segment with said socket having a central axis aligned substantially with said primary axis of said tang.

8. The hand tool claim 1 wherein said handle adapter is molded directly onto said tang.

9. The hand tool of claim 1 wherein said socket has a noncircular cross-sectional shape defining an elongated cross-sectional axis extending substantially in the direction forces are normally applied to said tang during tool use.

10. The hand tool of claim 1 wherein said tool head includes a pair of relatively movable head members each having a mounting tang thereon, each of said tangs having one of said handle adapters mounted thereon, and a pair of said tool handles each having one end for slide-fit reception into the socket of the associated handle adapter.

11. A hand tool, comprising:
- a tool handle having a rearwardly projecting mounting tang defining a primary tang axis and having a rear end segment offset from and parallel to said primary axis;
- a handle adapter fixed to said rear end segment of said tang, said handle adapter defining a rearwardly open socket aligned generally with said primary axis, said handle adapter further defining a rearwardly open side slot extending longitudinally along one side of said socket;
- a tool handle having a front end sized and shaped for slide-fit reception into said socket; and
- a pair of clamps carried about said handle adapter at longitudinally spaced positions along the length of said socket for tightly clamping said front end of said handle within said socket, wherein at least the one of said clamps disposed closer to the open rear end of the socket is releasable to permit removal of said handle front end from said socket.

12. The hand tool of claim 11 further including an adapter cuff mounted on said front end of said tool handle, said adapter cuff having a size and shape for substantially mated slide-fit reception into said socket of said handle adapter.

13. The hand tool of claim 12 wherein said handle adapter and said cuff cooperatively define tooth and notch means for snap-fit interengagement when said cuff is fully seated within said socket of said handle adapter.

14. The hand tool of claim 13 wherein said tooth and notch means comprises a tooth on said handle adapter to project into said socket, and a notch formed in said cuff.

15. The hand tool of claim 13 wherein said tooth and notch means define interengageable ramped surfaces to permit slide-out removal of said handle from said handle adapter.

16. The hand tool of claim 11 wherein said handle adapter is molded directly onto said tang.

17. The hand tool of claim 16 further including a cuff molded directly onto said handle, said cuff having a size and shape for mating slide-fit reception into said socket.

18. The hand tool of claim 17 wherein said handle comprises a lightweight fiber-resin composite material.

19. The hand tool of claim 18 wherein said socket has a noncircular cross-sectional shape defining an elongated cross-sectional axis extending substantially in the direction of forces normally applied to said tang during tool use.

20. A hand tool, comprising:
- a tool head having a rearwardly projecting mounting tang defining a primary tang axis and having a rear end segment offset from said primary axis;
- a handle adapter on said rear end segment of said tang, said handle adapter defining a rearwardly open socket aligned generally with said primary axis, said handle adapter further defining a rearwardly open side slot extending longitudinally along one side of said socket;
- a tool handle having a front end;
- a cuff on said front end of said handle and having a size and shape for substantially mating slide-fit reception into said socket;
- said handle adapter and said cuff cooperatively defining tooth and notch means for snap-fit interengagement when said cuff is fully seated within said socket of said handle adapter; and
- a pair of clamps carried about said handle adapter at longitudinally spaced positions along the length of said socket for tightly clamping said front end of said handle within said socket, wherein at least one of said clamps disposed closer to the open rear end of the socket is releasable to permit removal of said handle front end from said socket.

21. The hand tool of claim 20 wherein said tooth and notch means define interengageable ramped surfaces to permit slide-out removal of said handle from said handle adapter.

22. The hand tool of claim 20 wherein said front end of said handle and said cuff define a key-locked interface.

23. The hand tool of claim 20 wherein said tang and said handle adapter define a key-locked interface.

24. A hand tool, comprising:
- a tool handle having a rearwardly projecting mounting tang defining a primary tang axis and having a rear end segment offset from and parallel to said primary axis;
- a handle adapter molded onto said rear end segment of said tang, said handle adapter defining a rearwardly open socket aligned generally with said primary axis, said socket having a noncircular cross-sectional shape defining an elongated cross-sectional axis extending substantially in the direction forces are normally applied to said tang during tool use;
- a tool handle having a front end sized and shaped for slide-fit reception into said socket; and
- clamp means carried about said handle adapter for tightly clamping said front end of said handle within said socket.

25. The hand tool of claim 24 including a cuff on said front end of said handle and having a size and shape for substantially mating slide-fit reception into said socket.

26. The hand tool of claim 25 wherein said front end of said handle and said cuff define a key-locked interface.

27. The hand tool of claim 25 wherein said tang and said handle adapter define a key-locked interface.

* * * * *